(12) United States Patent
Mele et al.

(10) Patent No.: US 8,234,194 B2
(45) Date of Patent: Jul. 31, 2012

(54) LIFE CALENDAR

(75) Inventors: Helene Urban Mele, Denver, NC (US); William F Borowski, Millbury, MA (US); Willard H. Waldron, III, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 219 days.

(21) Appl. No.: 12/708,446

(22) Filed: Feb. 18, 2010

(65) Prior Publication Data

US 2011/0202474 A1 Aug. 18, 2011

(51) Int. Cl.
*G06Q 40/00* (2012.01)
(52) U.S. Cl. .......................................... 705/35; 705/36 R
(58) Field of Classification Search .................. None
See application file for complete search history.

(56) References Cited

U.S. PATENT DOCUMENTS

| 6,073,110 A * | 6/2000 | Rhodes et al. ............... 705/7.12 |
| 2007/0219875 A1* | 9/2007 | Toulotte .......................... 705/26 |
| 2009/0083638 A1* | 3/2009 | Gupta ........................... 715/752 |

* cited by examiner

*Primary Examiner* — Olabode Akintola
(74) *Attorney, Agent, or Firm* — Michael A. Springs; Moore & Van Allen PLLC; Andrew D. Gerschutz (57) ABSTRACT

A method for providing a life calendar for a user includes gathering and tracking user data. The user data includes data associated with user-specific events and financial data. Recommendations are determined for the life calendar user based on the user data and may be refined based on bank data. Upon request, the life calendar is presented to the user populated with at least one of user data, user events, and recommendations.

25 Claims, 8 Drawing Sheets

LIFE CALENDAR

BACKGROUND

Currently, banks provide financial data for people through bank statements. People may have difficulty determining their financial needs based simply on bank statements. Indeed, peoples' lives are variable and their financial needs change based on life events. For example, a person's financial needs change after having a child but a bank statement does not provide assistance in determining what to do next. Banks are continually looking to provide better service to people. However, there is no way to link banks to life events so that banks may assist a person in determining their financial needs. Accordingly, there is currently no product that is capable of organizing peoples' financial data and life events given the variability of peoples' lives.

SUMMARY

Financial data can be used to track users' life events because a particular life event has closely associated expenditures. Financial data can also be used to establish and maintain a calendar of life events. Further, life event data can also be determined from data sources such as social networking sites. Also, financial data from similarly situated people can be used to predict users' needs and develop recommendations. A life calendar with financial data, life events, and recommendations will assist a user in determining their financial needs.

In accordance with an aspect of the invention, a method for providing a life calendar includes providing an electronic calendar for a user. The electronic calendar is automatically populated with the user's life events and financial transactions so that the user can easily view and keep track of his life and financial situation over time. For example, the electronic calendar may be populated with life events such as the birth of a child and financial events such as a stock split. The life events and financial data are gathered from various sources, including bank data sources and linked non-bank data sources like social networking sites. Optionally, recommendations relating to products or services are provided to the user based on the life events and financial data. The electronic calendar is presented to the user so that the user may access his life events, financial data, and recommendations in an organized and intuitive manner.

In accordance with another aspect of the invention, a method for providing a life calendar for a user includes receiving user data associated with a user, where the user data includes user-specific life events and financial data. Recommendations for the user are determined based on the user data, and the user data and the recommendations are associated with the life calendar so that when the life calendar is presented to the user, the user data and/or recommendations are also presented in the life calendar.

In accordance with yet another aspect of the invention, a method for providing a life calendar includes receiving user data associated with a user. The user data includes user-specific events and financial data from at least one of a bank data source or a linked non-bank data source. These user-specific events include events associated with financial events and life events of the user. Recommendations for the user may be determined based on the user data and the recommendations may be refined using data uniquely available to and maintained by the bank. The life calendar is associated with the user data and recommendations so that when the life calendar is presented to the user, at least one of the user data and recommendations are also displayed.

In accordance with a still further aspect of the invention, a computer program product for a life calendar for a user includes a computer-readable medium having executable instructions residing therein. The computer program includes instructions for receiving user data from bank and non-bank data sources. The computer program product also includes instructions for determining user events based on user data and providing recommendations based on user events and user data. The computer program product further includes instructions for refining recommendations based on a comparison of bank data and presenting the user data, user events, and recommendations in an automatically-populated life calendar.

In accordance with still yet another aspect of the invention, a system for a life calendar includes a processor and an application operable on the processor. The application is configured to receive user data, where the user data includes data associated with user-specific events and financial data of the user. The user data is used to identify user events and provide user recommendations. The recommendations may be refined by use of bank data. The user data, user events, and recommendations are automatically populated in the life calendar and presented to the user upon request.

Other aspects and features, as defined by the claims, will become apparent to those skilled in the art upon review of the following non-limited detailed description of the invention in conjunction with the accompanying figures.

DETAILED DESCRIPTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Embodiments of the present invention are described below with reference to flowchart illustrations and/or block diagrams of such methods and apparatuses. It will be understood that each block of the flowchart illustrations and/or block diagrams, and/or combinations of blocks in the flowchart illustrations and/or block diagrams, can be implemented by computer-executable program instructions (i.e., computer-executable program code). These computer-executable program instructions may be provided to a processor of a general purpose computer, special purpose computer, or other programmable data processing apparatus to produce a particular machine, such that the instructions, which execute via the processor of the computer or other programmable data processing apparatus, create a mechanism for implementing the functions/acts specified in the flowchart and/or block diagram block or blocks. As used herein, a processor may be "configured to" perform a certain function in a variety of ways, including, for example, by having one or more general-purpose circuits perform the function by executing one or more computer-executable program instructions embodied in a computer-readable medium, and/or by having one or more application-specific circuits perform the function.

These computer-executable program instructions may be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

Any combination of one or more computer-readable media/medium may be utilized. In the context of this document, a computer-readable storage medium may be any medium that can contain or store data, such as a program for use by or in connection with an instruction execution system, apparatus, or device. The computer-readable medium may be a transitory computer-readable medium or a non-transitory computer-readable medium.

A transitory computer-readable medium may be, for example, but not limited to, a propagation signal capable of carrying or otherwise communicating data, such as computer-executable program instructions. For example, a transitory computer-readable medium may include a propagated data signal with computer-executable program instructions embodied therein, for example, in base band or as part of a carrier wave. Such a propagated signal may take any of a variety of forms, including, but not limited to, electro-magnetic, optical, or any suitable combination thereof. A transitory computer-readable medium may be any computer-readable medium that can contain, store, communicate, propagate, or transport program code for use by or in connection with an instruction execution system, apparatus, or device. Program code embodied in a transitory computer-readable medium may be transmitted using any appropriate medium, including but not limited to wireless, wireline, optical fiber cable, radio frequency (RF), etc.

A non-transitory computer-readable medium may be, for example, but not limited to, a tangible electronic, magnetic, optical, electromagnetic, infrared, or semiconductor storage system, apparatus, device, or any suitable combination of the foregoing. More specific examples (a non-exhaustive list) of the non-transitory computer-readable medium would include, but is not limited to, the following: an electrical device having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It will also be understood that one or more computer-executable program instructions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program instructions for carrying out operations of embodiments of the present invention are written in conventional procedural programming languages, such as the "C" programming languages and/or similar programming languages. The computer program instructions may alternatively or additionally be written in one or more multi-paradigm programming languages, such as, for example, F#.

The computer program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention may take the form of an entirely hardware embodiment, an entirely software embodiment (including firmware, resident software, microcode, etc.) or an embodiment combining software and hardware aspects that may all generally be referred to herein as a "module," "apparatus," or "system."

The following detailed description refers to the accompanying drawings which illustrate specific embodiments of the invention. Other embodiments having different structures and operations do not depart from the scope of the present invention.

It should be understood that terms like "bank," "financial institution," and just "institution" are used herein in their broadest sense. Institutions, organizations, or even individuals that process financial transactions are widely varied in their organization and structure. Terms like bank and financial institution are intended to encompass all such possibilities, including but not limited to, finance companies, stock brokerages, credit unions, mortgage companies, insurance companies, etc. Additionally, disclosed embodiments may suggest or illustrate the use of agencies or contractors external to the financial institution to perform some of the calculations and data delivery services. These illustrations are examples only, and an institution or business can implement the entire invention on their own computer systems or even a single work station if appropriate databases are present and can be accessed.

As illustrated in FIGS. 1-8, aspects of the present disclosure include methods, apparatuses, systems and computer program products directed to a life calendar. In one embodiment, a life calendar relates to a calendar providing access to financial transactions and life events of a user. In an embodiment, a life calendar is a calendar displaying a user's life events, financial transactions, and recommendations in the days, weeks, months, or years in which those events and transactions occur, or when the recommendations are appropriate. A user enrolls in the life calendar program and the life calendar is automatically populated with the user's financial transactions and life events. Accordingly, the life calendar provides organization and access to the user's financial data and life events in an easy to access and intuitive format. Creation, management and presentation of the life calendar is discussed in more depth below with regard to FIGS. 1-8.

Figure 1:
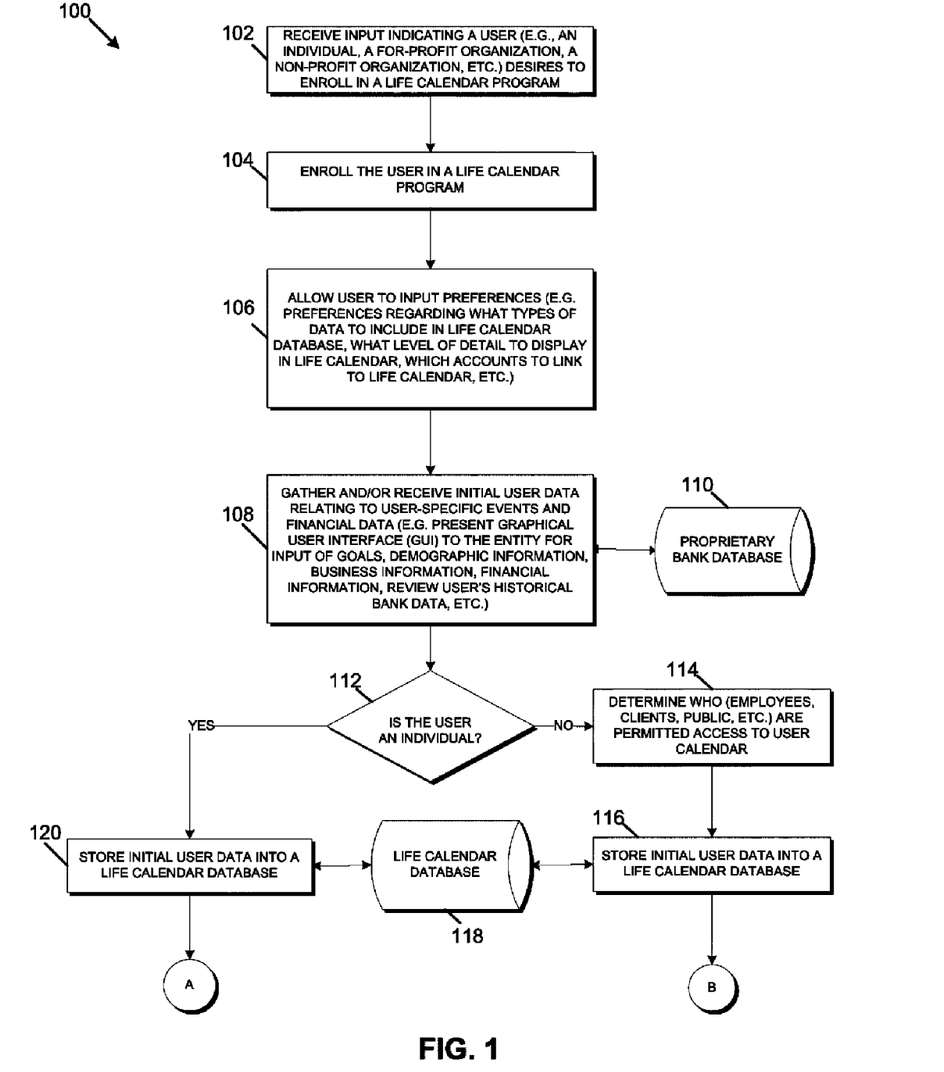
FIG. 1 is a flow chart of a method for creating a life calendar in accordance with some embodiments.

FIG. 1 is a flow chart of an example of a method 100 for creating and maintaining a life calendar in accordance with an embodiment of the present invention. In block 102, a user indicates to the life calendar provider that the user desires to enroll in the life calendar. The indication may be verbal (e.g., in person) or non-verbal (e.g., via an online banking system). The user may make the indication directly to the bank or to a third party that is associated with the bank. This indication is received in person, over the phone, via a computer system, via an email or an online form transmitted over a network (e.g., an online banking system), through the postal system, or in any other manner. It should be understood that the user, as used herein, may be a customer of the financial institution, a person associated with a customer of the financial institution, or not a current customer of the financial institution, such as a potential customer. For example, in one embodiment, the user is a current customer of the financial institution such that the financial institution has financial transaction data and/or other data associated directly with the specific customer.

In block 104, the user is enrolled in the life calendar in response to the customer accepting enrollment terms and/or other terms. In one embodiment, the user indicates a desire to enroll in the life calendar program offered by the user's financial institution (or other entity) and the user is enrolled in the life calendar program through a website or other means. It should be understood that the user may enroll in the life calendar program in any manner in which the user is able to communicate with the bank, in addition to those methods set forth herein.

In block 106, the user is allowed to input preferences and/or settings for the life calendar program that enables the user to customize the life calendar for his particular needs. These preferences and/or settings relate to management of the life calendar; for example, preferences and/or settings regulate various operations of creating, managing and presenting the life calendar to the user, such as what types of data to include in the life calendar database, what level of detail to display in the life calendar, which accounts to automatically link to through the life calendar, how the life calendar program should contact the user, how different levels of access for users are provided, when to alert the user according to triggering events or recommendations, or any other preferences and/or settings appropriate to customize the life calendar. Many different types of preferences and/or settings are also possible and the present invention should not be limited to the above-recited customization options. In one embodiment, all of the user's preferences and/or settings are selected by the user with no guidance from the life calendar provider. In another embodiment, one or more preferences and/or settings are suggested by the life calendar provider and may be based on data owned by the provider of the life calendar or default settings. For example, the life calendar provider may suggest linking an external financial account (i.e., an account that is external to the financial institution) to the life calendar, or links to other websites based on transfers between the user's account and the outside account.

In block 108, the life calendar gathers or receives user data relating to user-specific events and financial data of the user. In some embodiments, the user data is any data relating to the specific user, including data regarding the user's current financial situation, data regarding the user's past financial situation, non-financial data, or any other data associated with the user. For example, the life calendar may gather or receive data on the user's current checking account transactions and may also gather data on the user's past checking account transactions and balances. In one embodiment, user data is continuously gathered or received and, in another embodiment, the user data is gathered or received only at the request of the user. The user data may be provided to the financial institution by the user or may be provided by a party other than the user, such as a bank data source or a non-bank data source. It should be understood that the user data may be gathered or received by an entity managing or operating the life calendar program, such as by the user's financial institution, a contractor of the financial institution, a third party entity, or some other entity.

Additionally in block 108, the life calendar also gathers or receives user data relating to user-specific events. User-specific events include any event in which the user is a direct or indirect participant. For example, user-specific events relate to various phases, events and/or aspects associated with the user's life, including the user's age, health of the user, marriage of the user, a divorce of the user, the user becoming a parent, death in the user's family, job loss for the user, or any other event or aspect associated with the user and/or the user's family. The user may input these user-specific events or user-specific events may be determined from received user data. For example, a user may input information regarding a home purchase to indicate that the user is now a home-owner. By way of another example, data gathered from a financial account linked to the user may indicate life events, for instance mortgage payments may indicate that the user is a home-owner. The life calendar can solicit input from the user to appropriately fill in the life calendar, for example to clarify any required mortgage payments of the user. Similarly, the life calendar program can automatically conclude that the user is a home-owner based on received information or data, such as information from a news release or public GIS records. Nonetheless, it should be understood that the life calendar may have any number of user-specific events included therein and these events can be determined via any manner, such as user input, input from another person (e.g., a bank employee, a friend of the user, a family member of the user, etc.), indications from the user data, or by any other means.

As illustrated in block 110, the life calendar may be associated with data in a bank database relating to the user. In some embodiments, the bank database is a database that is owned by the user's financial institution. In other embodiments, the bank database is a database that is owned by one or more financial institutions other than the financial institution creating and managing the life calendar. According to various embodiments, the bank database includes user data regarding the users' bank accounts, transactions, requests, demographic information and the like. Any type of user data gathered and/or received by the life calendar and described herein may also be present in a bank database. Other types of bank data are possible, such as confidential bank data or data unique to the bank, and one skilled in the art would know the additional categories to include in the life calendar program.

The life calendar gathers and/or receives financial data associated with the user. The financial data can be actual financial transaction data or a user's plans relating to finances. In one embodiment, financial data relates to the balances and transactions in a user's savings accounts, checking accounts, investment accounts, credit accounts, and the like. In another embodiment, the user plans includes the user's financial goals, the level of risk a user is comfortable with, the level of return on investments a user desires, predicted future changes to a user's financial situation, user input of user demographics, cash flows, or any other future or present plans associated with the user's finances. One skilled in the art would recognize that the aforementioned categories are not limiting relating to a user's financial situation, and a life calendar may include other types of data.

In block 112 a determination is made as to whether the enrolled user is an individual or other entity. While the user may be an individual person, the user can also be a non-individual entity, including a group of people (e.g., family, a related social network, etc.) or other entity (e.g., small businesses, large corporations, partnerships, non-profit organizations, etc.). If the user is determined to be an individual in block 112, the method 100 proceeds to block 120, which is discussed later. Otherwise, the method proceeds to block 114.

In block 114, if a user is not an individual, according to some embodiments, the life calendar is customized by determining who will have access to the life calendar. As such, access to the life calendar is predefined for those associated with the non-individual entity, such as employees of a company, clients of the non-individual entity, the public or any other individual or predefined group as pre-selected by the user.

In block 116, the user data relating to user-specific events and financial data are stored in a life calendar database. The life calendar database 118 includes any stored information related to user enrollment information, user preferences, and user data, including the user-specific events and financial data. In one embodiment, the life calendar database is updated on an ongoing basis as the user's preferences, financial situation, and life situation change. In another embodiment, the user is able to indicate when the life calendar database should be updated. The life calendar database can be updated at any time or schedule, including on a pre-determined schedule, on a default schedule, or any other time frame.

Figure 2:
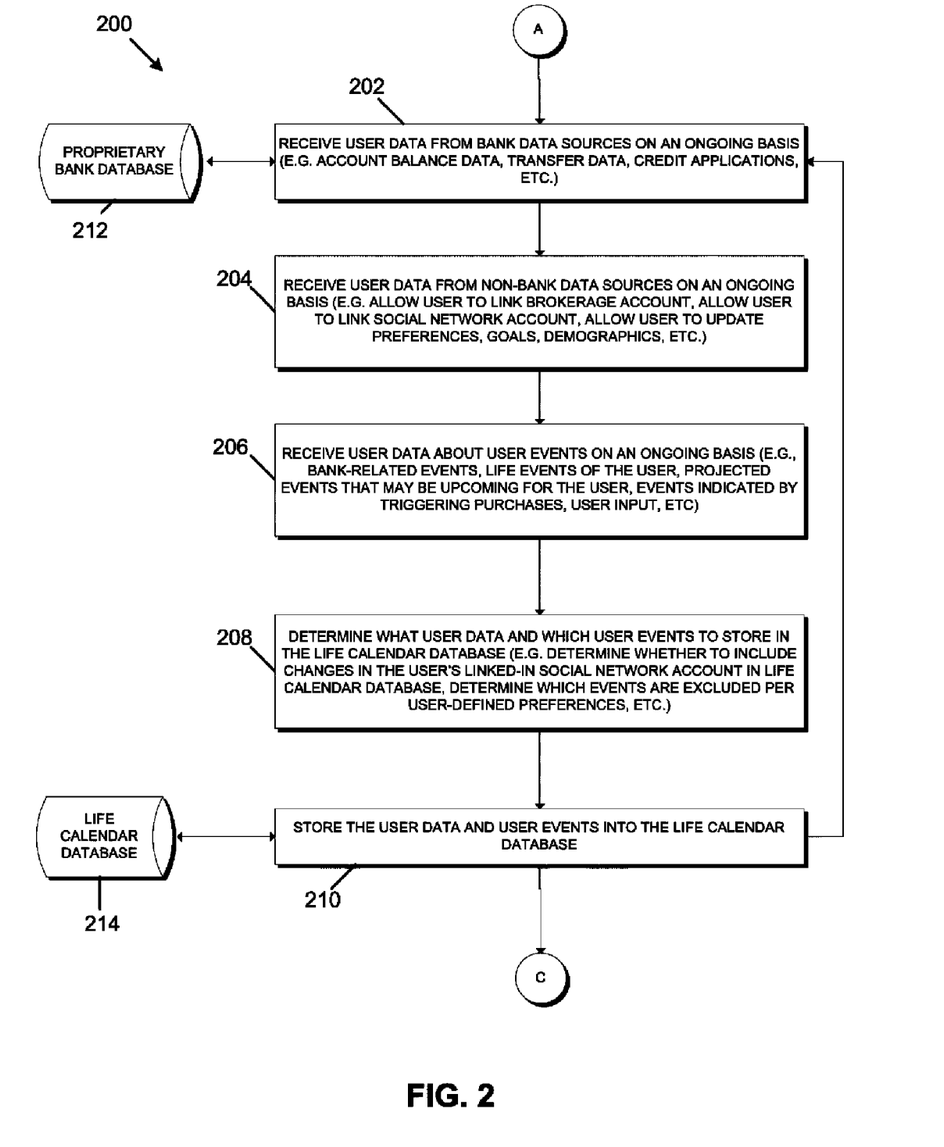
FIG. 2 is a flow chart of a method for providing a life calendar when the user is an individual in accordance with some embodiments.
Figure 3:
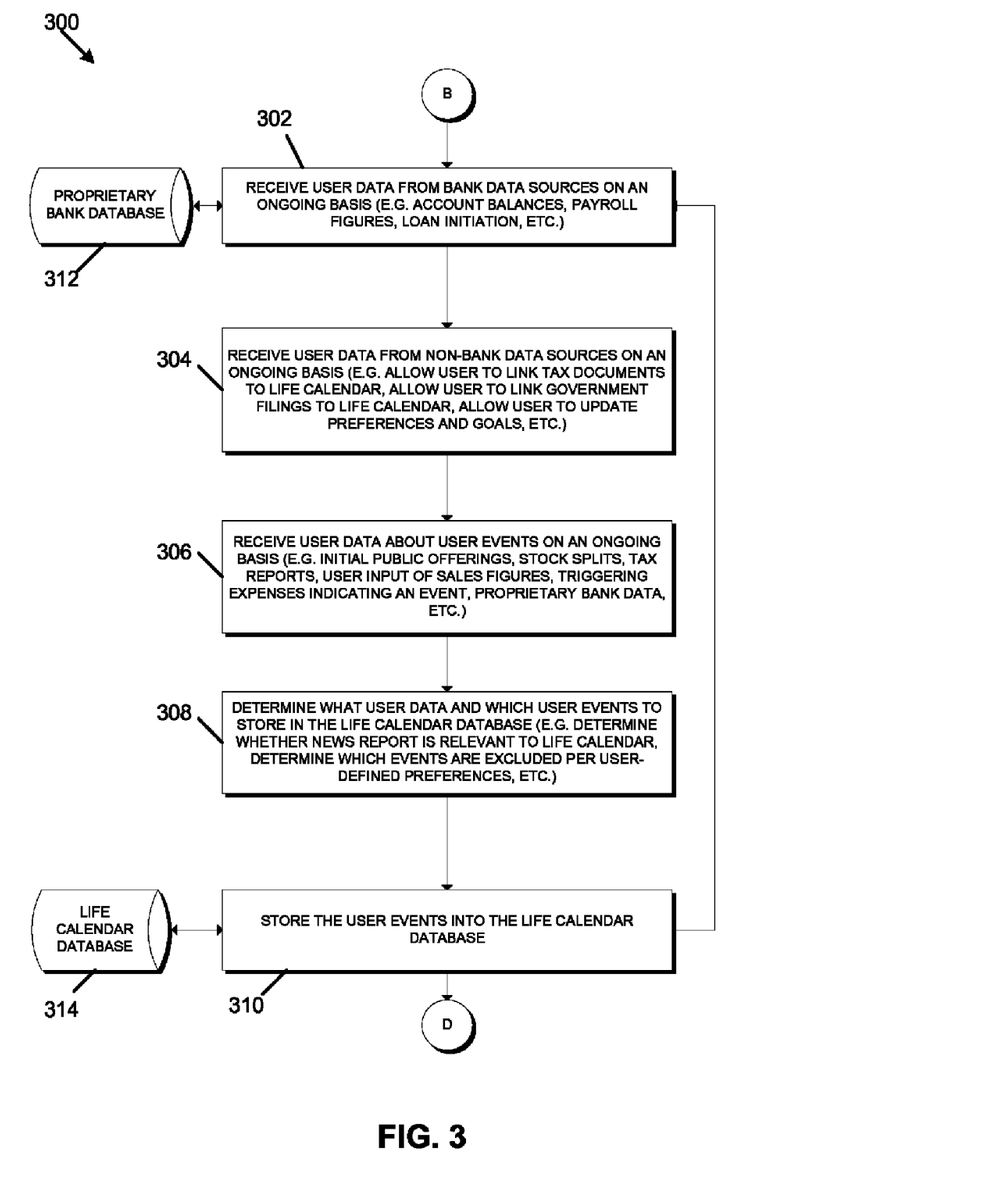
FIG. 3 is a flow chart of a method for providing a life calendar when the user is not an individual in accordance with some embodiments.

Turning now to FIGS. 2 and 3, FIG. 2 illustrates a process 200 for tracking an individual user's data, while FIG. 3 illustrates a process 300 for tracking a non-individual user's data. Both processes will be described concurrently below. It should be noted that the methods of tracking user data for individuals and non-individuals may differ and thus, these methods reflect different embodiments of the invention.

In blocks 202 and 302, the life calendar tracks the user's data by receiving user data from bank data sources, according to some embodiments. Each bank data source is any source of data associated with a financial institution. In various embodiments, the life calendar receives the user data via any manner, such as by user input or through electronic media such as data storage devices (CDs, DVDs, hard drives, computer files, databases, bank data sources, etc.). The user may be required to provide permission for the life calendar to track the data or the data may be public domain data. The bank data may come from the provider of the life calendar or from a financial institution that does not provide the life calendar. In one embodiment, bank data sources comprise all of the financial accounts of the user electronically linked to the life calendar so that the user data is automatically transferred to the life calendar.

The bank data source may be a bank database, as shown in blocks 212 and 312, or it may be publicly available data to which the financial institution has access. In another embodiment, there may be multiple bank data sources that include both bank and public data sources. The bank data source includes data relating to a checking account, savings account, investment account, credit account, or any other source of data stored at or available to the bank. The bank data source provided data relating to, for example, a user's financial and life situation such as mortgages, student loans, 529 plans, travel plans, social security payments, etc.

In another embodiment, the life calendar tracks user-specific events and financial data using linked non-bank data sources, as shown in blocks 204 and 304. Non-bank data sources are sources of data that are not related to financial institutions, such as social networking accounts, government accounts, educational accounts, business accounts, organization databases including sports schedules or nonprofit information, or other types of data sources that may be linked to the life calendar to provide user data. It should be noted that the non-bank data sources may have financial connections to the user but the primary purpose of the data source is not related to the user's finances. In one embodiment, the non-bank data source is linked to the life calendar by the user. In another embodiment, the non-bank data source is linked to the life calendar by the life calendar provider, either with permission of the user or by default. Similar to the bank data sources, the non-bank data source may provide data relating to the user's relationship status, retirement accounts, business growth, etc. In another embodiment, user input of changed preferences, goals, or demographics is considered a non-bank data source.

In blocks 206 and 306, the life calendar receives data about user events on an ongoing basis from bank and non-bank data sources. The user events that are included in the life calendar may be pre-determined by the user, may be defaults created by the bank or a third party, or may be identified based on bank data. For example, the birth of a child is a user event that results in changes in the user's life situation. In another example, paying off a loan is another user event related to a change in the user's financial situation. In various embodiments, user events are identified by user input, by received financial data such as paying off a loan, by received user data relating to user-specific events such as a marriage, by pre-existing user data such as retirement based on the user's age, events indicated by triggering financial transactions, etc. A triggering financial transaction may be a purchase or series of purchases providing information about the user. An example of a triggering financial transaction includes a purchase by the user in another state indicating that the user took a trip (e.g., vacation, business trip, etc.) to that state. Other examples of triggering events include purchases at a maternity store indicating a pregnancy, purchases at a funeral home indicating a death, or a transfer from an estate indicating an inheritance. It should be understood that the user events may include a wide array of changes in a user's financial and life situation.

In blocks 208 and 308, the user data received by the life calendar from bank data sources and non-bank data sources are evaluated to determine whether the data is appropriate for inclusion in the life calendar database and/or life calendar display. In various embodiments, the user data is evaluated based on user preferences, based on indicia of relevance or reliability, or based on other criteria that indicate that the received user data is appropriate for inclusion in the life calendar database or the life calendar display. For example, the user preferences may indicate that relationship status in a social network is not appropriate for inclusion in the life calendar. In another embodiment, the user is queried to determine whether received user data is appropriate for inclusion in the life calendar.

In blocks 210 and 310, user data deemed appropriate for inclusion in the life calendar database are stored in the database. In an embodiment, the user data is tracked on an ongoing basis such that the life calendar continually receives, evaluates, and stores the data into the life calendar database, as shown in blocks 214 and 314, based on user data from bank data sources, non-bank data sources, and user events. In another embodiment, the life calendar tracks the user data only when requested to do so by the user.

Figure 4:
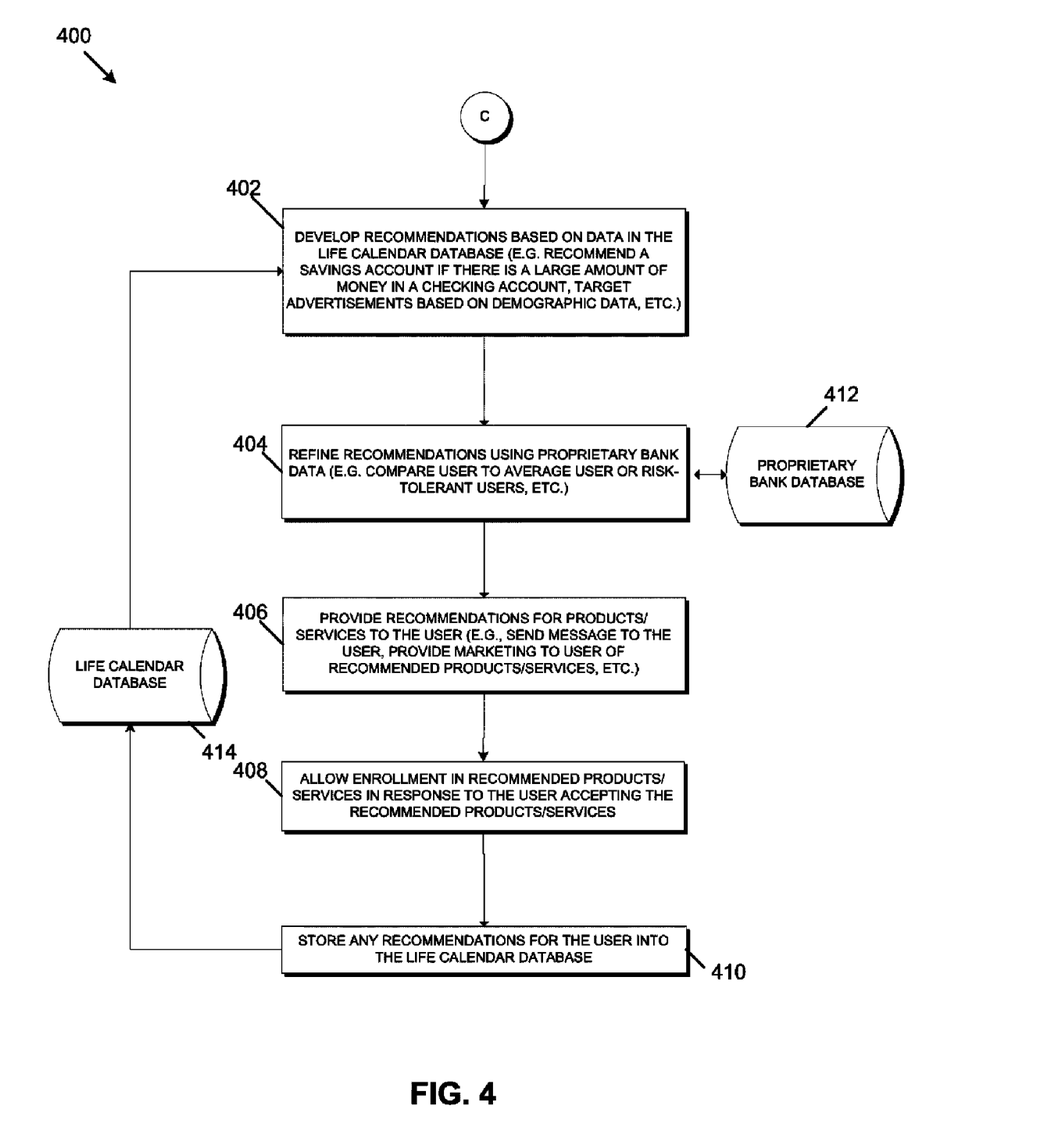
FIG. 4 is a flow chart of a method for developing recommendations for a life calendar when the user is an individual in accordance with some embodiments.
Figure 5:
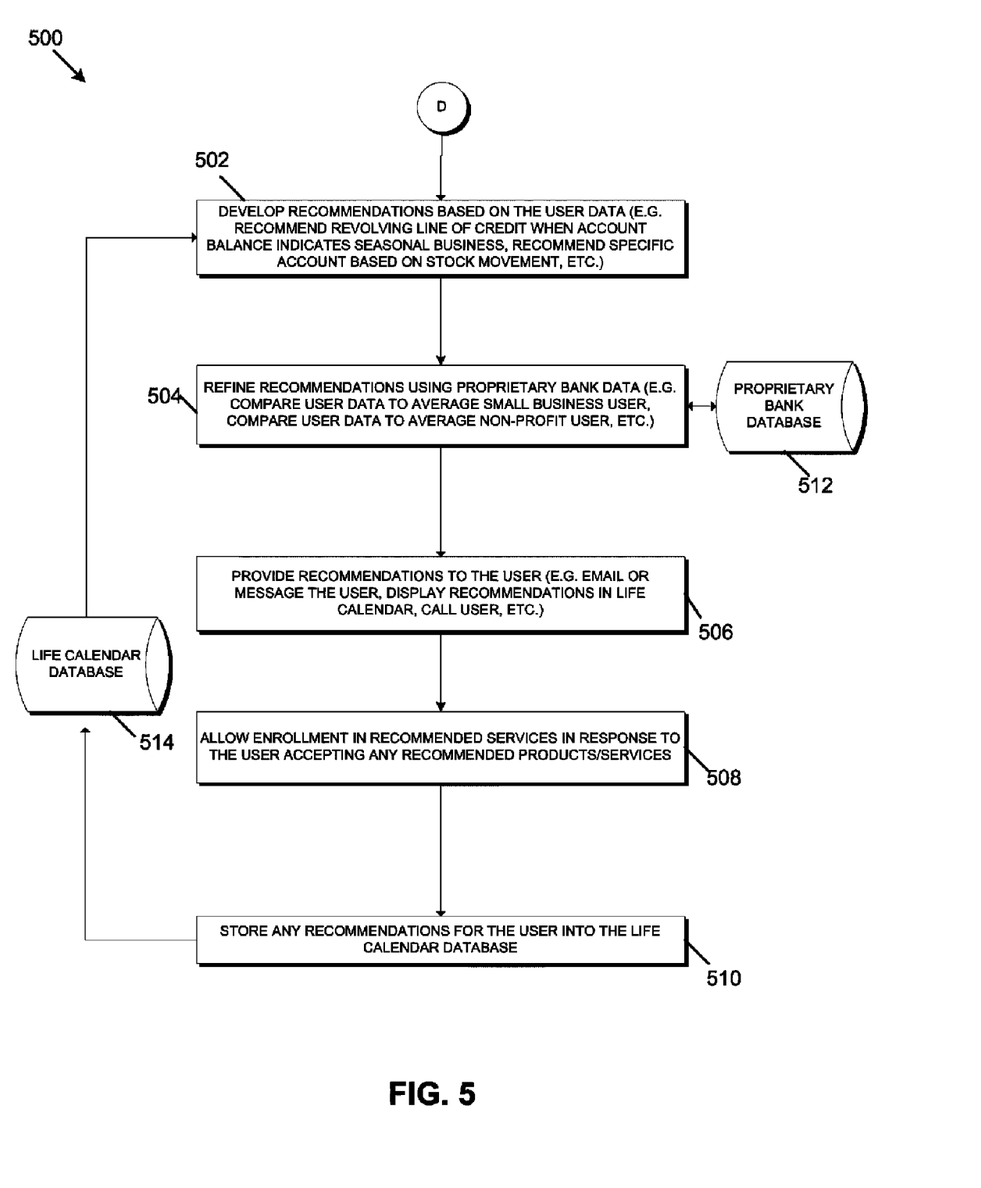
FIG. 5 is a flow chart of a method for developing recommendations for a life calendar when the user is not an individual in accordance with some embodiments.

In another embodiment, the life calendar provides recommendations based on the received user data. FIG. 4 illustrates the process 400 for providing recommendations to an individual user. FIG. 5 illustrates the process 500 for providing recommendations to a non-individual user. As discussed in more depth below with reference to FIGS. 4 and 5, the life calendar develops recommendations based on the user data, revises the recommendations based on a comparison of the user data to bank data, provides the recommendations to the user, allows enrollment in the recommended services or products, and stores any recommendations in the life calendar database, according to various embodiments.

In blocks 402 and 502, the recommendations for products, services, or other activities are developed based on the life calendar data. A recommendation is any sort of communication to the user that solicits a response by the user. For example, the user data may indicate that the user paid off a home equity loan and the life calendar may suggest investing the money that is no longer needed to make the loan payment into an individual retirement account (IRA). The recommendation can be a suggestion for a bank service or it can be a suggestion for an affiliated service. The recommendation may be for a product provided by the bank or appropriate for the user based on the bank's determination. Other examples of making recommendations based on user data include suggesting a 529 plan when the user data indicates that the user recently had a child, suggesting a revolving line of credit when the user data indicates that the business is seasonal, suggesting a home equity loan when user data indicates major expenses, and suggesting changing beneficiaries of retirement accounts when user data indicates that the user entered a relationship, etc. It is understood that the recommendations listed herein are not all-inclusive and numerous other recommendations may be included.

In blocks 404 and 504, the recommendations may be refined using bank data. The bank data is retrieved from a bank database, as shown in blocks 412 and 512. In one embodiment, the user data is compared to one or more models created using a set of the bank's customers, such as bank users similar to the life calendar user. In other embodiments, these models may include those created based on bank users residing in a similar geographic region, of a similar age, having similar financial goals, and the like. The recommendations are refined by providing information on how the life calendar user compares to such bank data. For example, the recommendations may be refined by suggesting that the life calendar user increases her savings by $100 per month because the model created from the comparison group has a higher savings level than the user. Other ways to refine the recommendations include suggesting enrollment in specific services, suggesting different investment allocations, suggesting a different business model, or other methods of refining the recommendations.

In blocks 406 and 506, the recommendations are provided to the life calendar user, such as providing the recommendation directly through the life calendar. In some embodiments, the recommendations are provided to the life calendar user through email, direct mail, phone calls, in-person solicitation, advertisements on life calendar affiliated websites, or any other manner.

In a further embodiment, the life calendar allows for enrollment in the recommended services either when the recommendation is provided to the user or at any time after the provision of the recommendation, as shown in blocks 408 and 508. The user may enroll in the recommended service or product directly through the life calendar. Instructions for enrolling may be listed when the recommendation is provided to the user.

In blocks 410 and 510, once a recommendation is made to a user, the recommendation is considered part of that user's data and the recommendations are stored in the life calendar database (blocks 414 and 514). The user's response or lack of response to the recommendation is considered informative user data relating to user-specific events and financial data. Storing the recommendation in the life calendar database, including whether the life calendar user acted on the recommendation, assists the life calendar provider, bank, etc., in refining future recommendations determined for the life calendar user.

Figure 6:
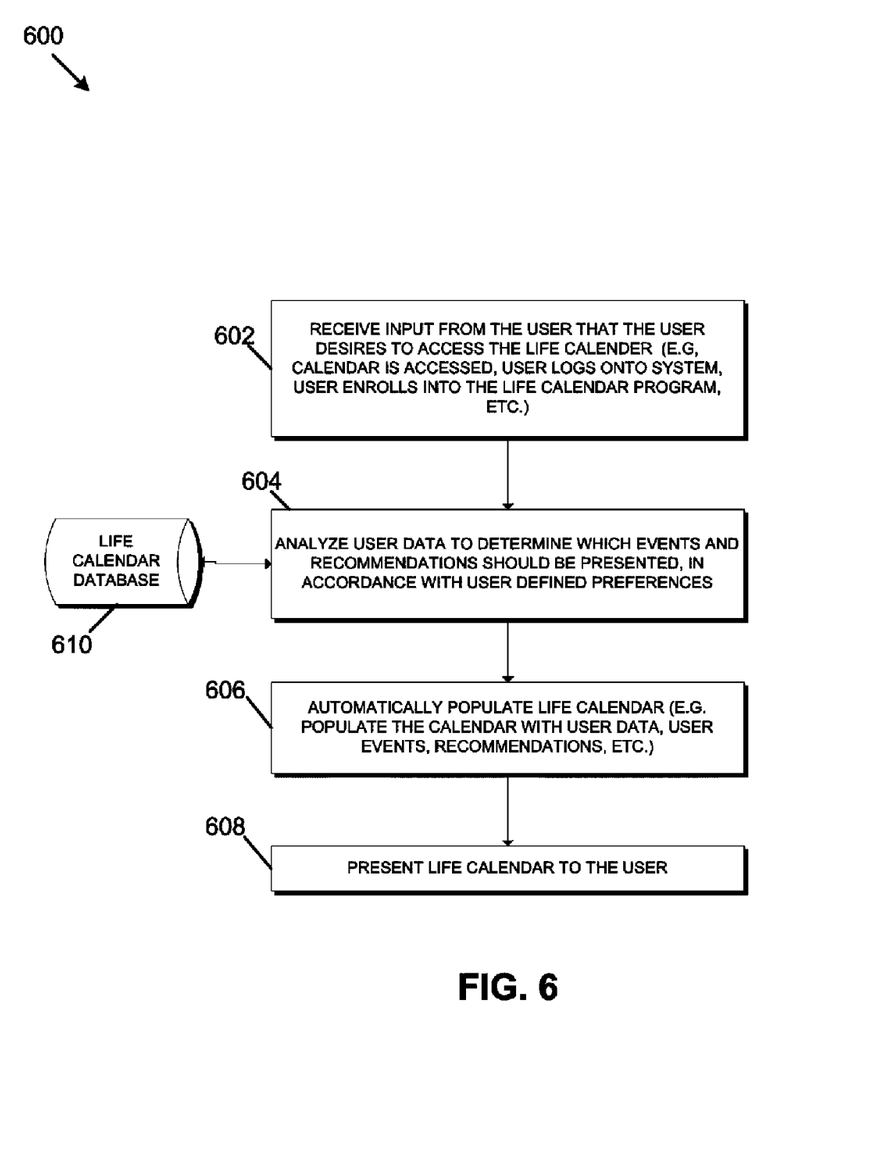
FIG. 6 is a flow chart of a method for presenting a life calendar in accordance with some embodiments.

Turning now to FIG. 6, the illustrated process 600 of FIG. 6 describes presenting the life calendar to the user. Aspects of this embodiment include receiving input that the user would like to access the life calendar, analyzing the user data to determine which data, events, and recommendations are displayed in the life calendar, automatically populating the life calendar with the information, and presenting the life calendar to the user.

In block 602, the life calendar program receives input from the user or other person that the user desires to access the life calendar, such as if the user or other person logs into an online life calendar program. In some embodiments, the user requests to view the life calendar, requests a print-out of the life calendar in person, through the mail, over the phone or by any other methods by which the user can receive the life calendar.

In block 604, the life calendar program analyzes the user data in the life calendar database (610) to determine the user data, the events, and/or the recommendations to present in the life calendar. In one example, the life calendar program determines what should be displayed in the life calendar in accordance with user-defined settings and preferences. In another embodiment, a decision to include data in the life calendar is made based on default rules, which may or may not be customizable by the user. In yet another embodiment, all user data is presented in the life calendar and the user may choose to hide certain data that is not of interest. Data may be appropriate for inclusion in the life calendar database but not relevant for display. User data in the life calendar data may assist in determining user-specific events, user recommendations, or when tracking financial transactions on an ongoing basis. For example, data on purchases in a different state may assist the life calendar program in making recommendations but may not be relevant for display.

In block 606, the life calendar is automatically populated with user data, user events, recommendations, and/or any other information analyzed in block 604. The life calendar may be populated for only the current selected time span (e.g., current week, current month, etc.) or for all time spans available. A combination of user data, user events, recommendations and/or other life calendar data populates the life calendar. The life calendar data may be populated on a per transaction basis or only upon request of the user. In one embodiment, the user data, user events, recommendations and/or other life calendar data are automatically populated in the life calendar so that they are viewed by the user.

In block 608, the life calendar is presented to the user. In some embodiments, the life calendar is presented in a browser, such as an internet browser or any browser on an operating system. In a further embodiment, the user links the life calendar to one or more computer programs. Other embodiments include presenting the life calendar on a personal digital assistant (PDA), smartphone, computer, mobile telecommunications device, an alerting device (e.g., a pager), or other electronic device. For example, portions of the life calendar, such as daily events, recommendations for the current day, etc., can be presented to the user via a calendar (or other software) on a user's PDA, laptop computer, or other electronic device. Further, the portions of the life calendar can be presented to the user via a user's mobile device (e.g., PDA, mobile phone, etc.) via an email message, Short Messaging Service (SMS) text message, Multimedia Messaging Service (MMS) text message, a telephone call to the user, a voice message, or any other method of presenting information to the user via the user's electronic devices. The life calendar can be presented to the user in a visual format, audibly, any combination thereof or by any other method. It should be understood that a variety of ways of presenting the life calendar to the user are well within the scope of the present invention, and the previously-mentioned examples and embodiments are not intended to limit the method of presentation of the life calendar.

In one embodiment, the life calendar is an online product such that the user enrolls into an online account and one or more of the life calendar is generated and presented to the user by the online product. For example, the above described methods may be embodied in an online banking system where a user that has a financial account with a bank logs into the user's online account. Once the user logs into the user's account, the life calendar (or a portion thereof) can be accessed by the user via the online banking system. The life calendar is created based on the above-described methods. The life calendar (or portions thereof) can present financial recommendations, user specific events, and/or other data to the user based on the user's data, as previously discussed. For example, when logging in, the user can view the user's life calendar information for the current date, such as a Roth IRA deadline (if the life calendar determines that the user qualifies based on the user's income), relevant tax break deadlines that the user qualifies for based on the user's data, estate planning recommendations if there is a death in the user's family, other financial recommendations based on the user's bank data, the user's wedding anniversary date, the user's wife's birthday, other user-specific events the user might want calendared, the amount of dividends issued that day for the user's checking account, a budget alert for that day if the user's preset budget for a particular category (e.g., groceries) has been exceeded, and/or any other data associated with the user and the user's finances. The components and operations of some embodiments of the online product are described below with regard to FIG. 7.

Figure 7:
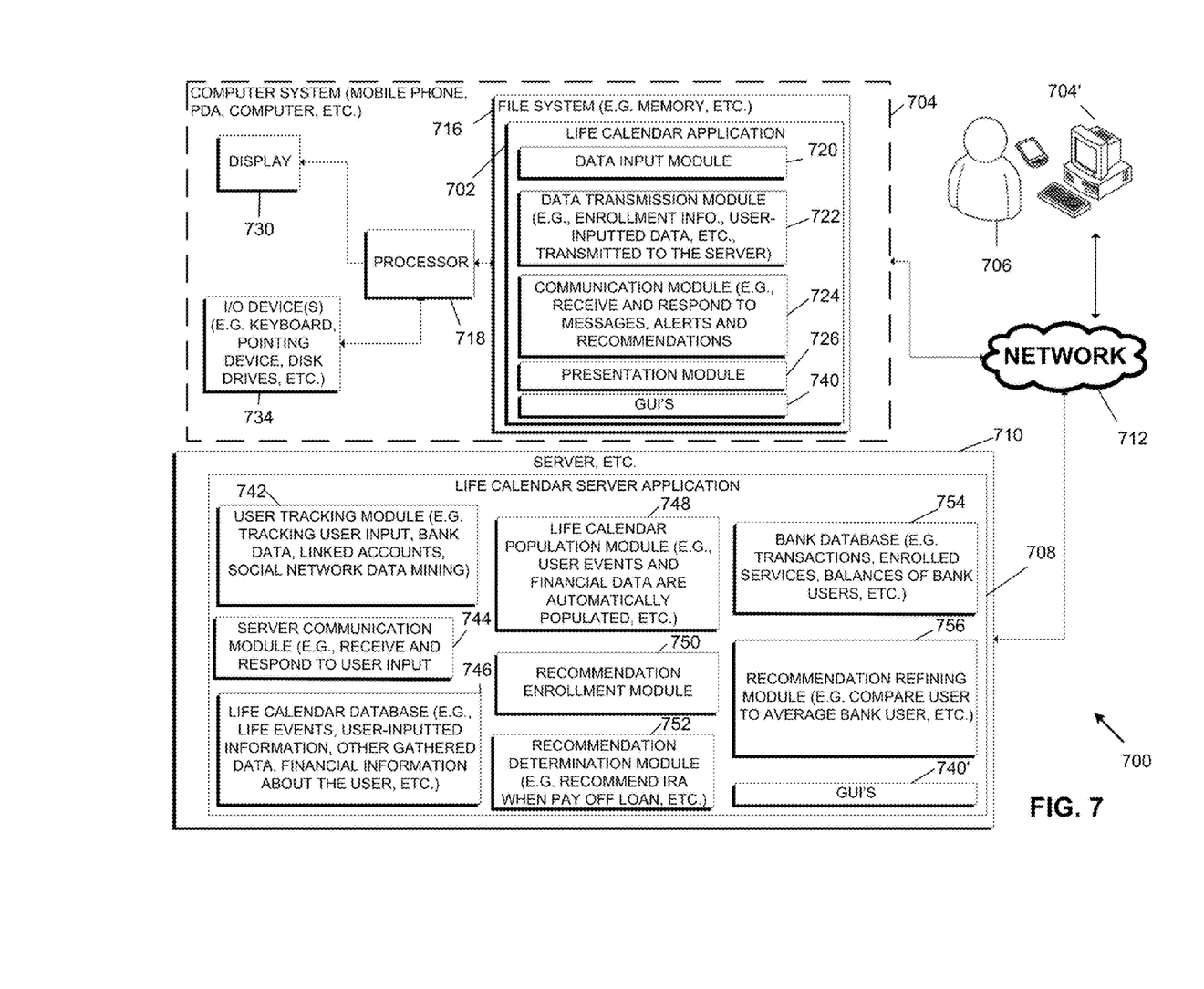
FIG. 7 is a block schematic diagram of an exemplary system for a life calendar in accordance with some embodiments.

FIG. 7 is a block schematic diagram of an example of a system 700 for a life calendar in accordance with some embodiments. The system 700 includes a life calendar application 702 operable on a computer system 704 or similar device of a user 706 or a client 704'. In addition to the life calendar application 702 on the user's computer system 704 or client 704', the system 700 includes a life calendar server application 708 operable on a server 710 and accessible by the user 706 or client 704' via a network 712. The previously discussed methods 100-600 are embodied or performed by the life calendar application 702 or the life calendar server application 708. For example, the methods 100-600 may be performed by the life calendar application 702. In another embodiment, the methods 100-600 are performed by the life calendar server application 708. In a further embodiment of the present invention, some of the features or functions of the methods 100-600 are performed by the life calendar application 702 on the user's computer system 704 and other features or functions of the methods 100-600 are performed on the life calendar server application 708.

The network 712 is the Internet, a private network or other network. Each computer system 704' is similar to the exemplary computer system 704 and associated components as illustrated in FIG. 7.

The life calendar application 702 and/or life calendar server application 708 is a self contained system with imbedded logic, decision making, state based operations and other functions that operate a life calendar product.

The life calendar application 702 is stored on a file system 716 or memory of a computer system 704. The life calendar application 702 may be accessed from the file system 716 and run on a processor 718 associated with the computer system 704.

The life calendar application 702 includes a data input module 720. The data input module 720 allows for entry of user information such as enrollment information, preferences, and updates. The data input module 720 is accessed or activated whenever the user 706 indicates a desire to activate the life calendar program and calls other modules such as the graphical user interface 740, as described below.

The life calendar application 702 also includes a data transmission module 722. At this point, the input of user information from the computer 704 is transmitted to the life calendar application 708 on the server 710 via the network 712. The input of user information can include enrollment information, user-inputted data regarding preferences, and the like inputted from the data input module 720 or information obtained via a different module.

The life calendar application 702 also includes a communication module 724. The communication module 724 allows a user to receive information from the life calendar server application 708 on the server 710. This information can be user data, user events, recommendations, other information to be displayed in the life calendar, or other information related to the functioning of the life calendar. The communication module 724 also allows a user to transmit back to the server 710 a response to the message, alert, and/or recommendation. The user is able to indicate a desire to enroll in the recommended product or service, accept a product recommendation presented by the bank, respond to an alert presented, or perform other functions which require communications between the computer 704 and the server 710.

The life calendar application 702 further includes a presentation module 726. The presentation module 726 presents the life calendar to the user so that the user may see any user data, user events, recommendations, and/or other information that have been populated in the life calendar. The presentation module 726 displays the life calendar in a browser, other software product via a PDA, smart phone, other computing device, or other similar electronic media.

The user's computer system 704 includes a display 730. Any graphical user interfaces 740 associated with the life calendar server application 708 is presented on the display 730. The user's computer system 704 also includes one or more input devices, output devices or combination input and output devices, collectively I/O devices 734. The I/O devices 734 includes a keyboard, computer pointing device, touch screen, touch pad, or similar devices to control input of information as described herein. The I/0 devices 734 also include disk drives or devices for reading computer media including computer readable or computer operable instructions.

The life calendar application 702 presents the current status and other desired information of the life calendar product to the user 706, such as by presenting the current status information to a display 730, storing the results in the file system 716, etc.

The life calendar server application 708 includes a user tracking module 742. The user tracking module 742 performs functions related to gathering data related to a user, including receiving data from bank data sources and non-bank data sources (not shown). The module also determines user events based on user data. The user tracking module 742 links the life calendar server application 708 on the server 710 to external data sources (not shown), including linked accounts and internal data sources, such as a bank database.

The life calendar server application 708 additionally includes a server communication module 744. The server communication module 744 performs operations similar to the communication module 724 on the user's computer 704, as previously discussed. However, the server communication module 744 performs the operations on the server 710 and communicates with other modules on the server 710, such as the recommendation enrollment module 750, which is discussed later.

The life calendar server application 708 also includes a life calendar database 746. The life calendar database 746 includes any stored information related to user enrollment information and user data, such as financial and life situation data associated with each user, each user's events, each user's preferences, each user's offered and accepted recommendations, and any other information associated with each user with regard to the life calendar product.

The life calendar server application 708 further includes a life calendar population module 748. The life calendar population module 748 is called when the user indicates a desire to view the life calendar. The life calendar population module 748 calls other modules on the server 710, such as the life calendar database 746 and the recommendation determination module 752, to populate the calendar according to the user's preferences with user data, events, recommendations and other information, and then to display the life calendar data so that the user may view the life calendar data on the computer system display 730.

The life calendar server application 708 yet further includes a recommendation enrollment module 750. The recommendation enrollment module 750 operates by interacting with modules on the server 710 and on the user's computer 704 to receive user input in response to recommendations made through the life calendar program. The recommendation enrollment module 750 allows the user to enroll in the service or product immediately or at any time after the recommendation is made. In one embodiment, the service is a service of the user's bank, including a new account, or a service of an affiliate of the bank (e.g., travel advisor, etc.). In some embodiments, the products are investment products offered by the user's bank or products offered by an entity affiliated with the user's bank, such as bonds, home insurance products, and the like.

The life calendar server application 708 yet further includes a bank database 754. The bank database 754 includes any stored information owned by and related to bank users, such as user transaction information, user balance information, user demographic information, and the like. The bank database 754 is used in connection with the recommendation refining module 756 in the life calendar server application 708.

The life calendar server application 708 also includes a recommendation determination module 752. The recommendation determination module 752 interacts with other modules on the server, such as the life calendar population module 748 and the life calendar database 746. The recommendation determination module 752 determines recommendations based on the user data and events and provides those recommendations to the user through various modules. The recommendation determination module 752 also revises any recommendations based on continually gathered data being tracked by the user tracking module 742. The recommendations are then transmitted to the life calendar and/or user.

The life calendar server application 708 also includes a recommendation refining module 756. The recommendation refining module 756 functions by comparing the life calendar user data and events to a model created using bank data. The recommendation refining module 756 then recommends that the user change financial habits and/or enroll in one or more recommended products or services based on the above-mentioned comparison. The recommendation refining module 756 interacts with other modules on the server 710, including the recommendation determination module 752, the life calendar population module 748, the life calendar database 746, and the bank database 754.

The life calendar application 702, 708 includes graphical user interfaces 740, 740', as previously mentioned. The life calendar application 702 and/or life calendar server application 708 allows one or more predetermined graphical user interfaces 740 to be presented to the user 706 in order for the user 706 to input data or information into the system 700. The graphical user interfaces 740 are predetermined and/or presented in response to the user 706 indicating the user 706 would like to perform a task associated with the life calendar, such as setting up display preferences, inputting user data and events, responding to recommendations, allowing other inputs, presenting information to the user and financial institution, etc. The predetermined graphical user interfaces 740 are generated by the life calendar application 702 and/or life calendar server application 708 and are presented on the display 730 at the computer system 704. Graphical user interfaces 740 also include graphical user interfaces that permit the user 706 to view the life calendar and query any of the databases and/or generate reports and/or respond to recommendations.

Figure 8:
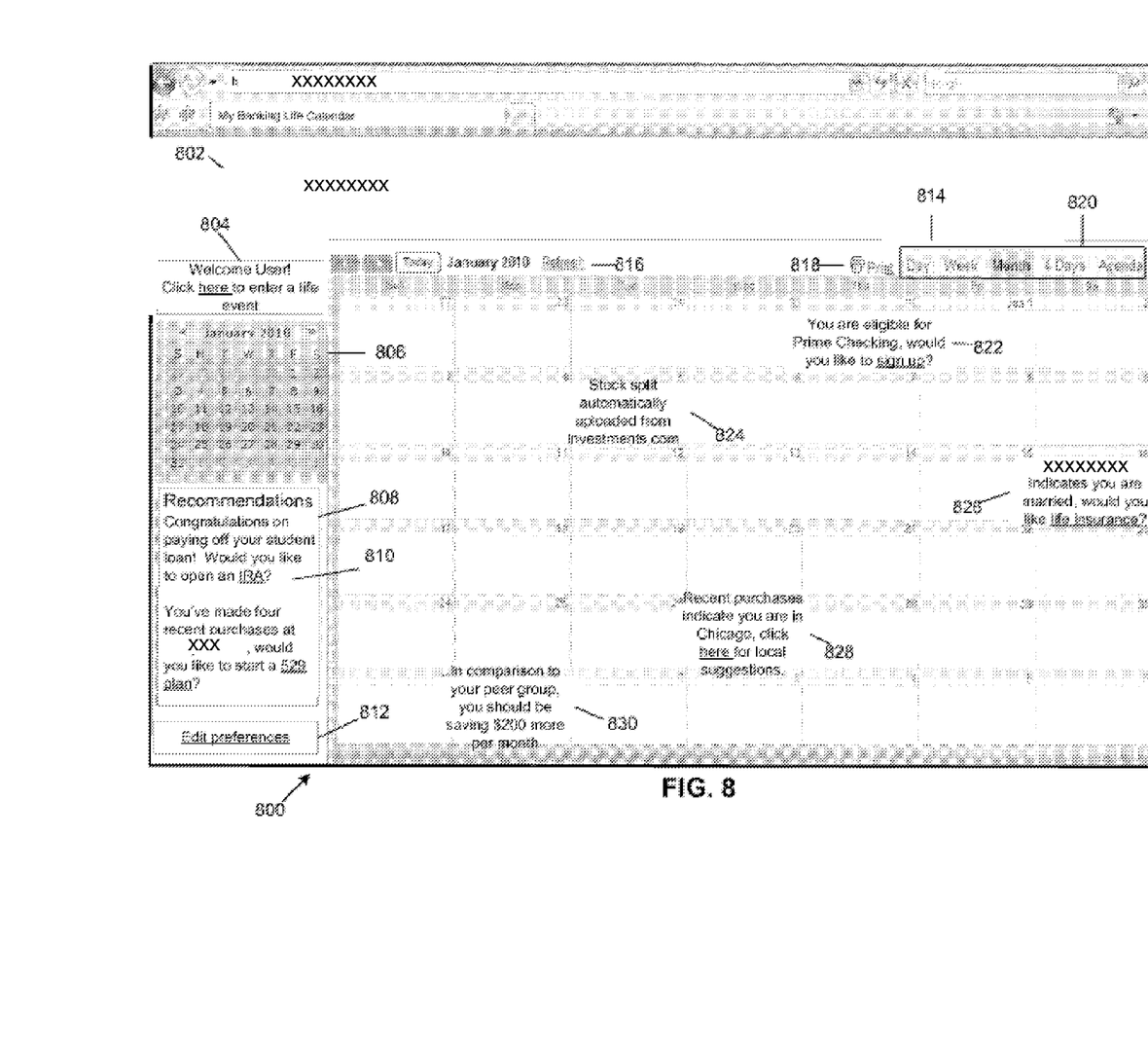
FIG. 8 is an example of a graphical user interface for a life calendar in accordance with some embodiments.

FIG. 8 is an exemplary embodiment of a life calendar presented to a user in accordance with the embodiments described above with regard to FIGS. 1-7. The life calendar 800 is illustrated as displayed in a website via a life calendar website address 802. The life calendar 800 presents user data, user events, recommendations, and/or other information in an organized and intuitive manner. The user data, user events, recommendations and other information for the life calendar of FIG. 8 was developed in accordance with the methods 100-700 as described above. The user is allowed to enter life events directly through the life calendar via a link 804 in the graphical user interface. The life calendar 800 allows the user to quickly and easily navigate the portion of the life calendar to be displayed, such as days, weeks, months, and years. Recommendations 808 are presented via the life calendar 800 and the user may immediately enroll in the recommended services or products 810 by clicking the link presented in the recommendation. The user is also allowed to edit preferences 812 regarding calendar display or any other feature related to the life calendar. The life calendar 800 also provides a calendar function 814 with embedded user data 824, user-specific events 826, and/or recommendations 822, 826, 828 and 830. The life calendar 800 is updated on an ongoing basis with user data on a real-time basis. The user can also refresh the calendar 816 at any time to populate the calendar with the most recent user data, events, and recommendations. The user can print the life calendar 800 via a print option 818 or click an option 820 to view different periods of time, such as a day, a week, a month or a user-designated period of time.

The user data, events, and recommendations are displayed directly in the life calendar 800 to the user. For example, a bank services recommendation 822 is illustrated as being offered on Jan. 31, 2010. Linked accounts indicate changes in the user's financial situation 824 or life situation 826. A recommendation 828 is presented to the user based on triggering purchases by the user. Also, informational alerts 830 are illustrated as being presented to the user based on a comparison to bank data associated with the user as compared with other users or products the user may take advantage of. The life calendar 800 described and illustrated in FIG. 8 is only meant to be directed to some embodiments and other embodiments are within the scope of the present invention based on the disclosure provided herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, functions repeated by the two blocks shown in succession may, in fact, be executed substantially concurrently, or the functions noted in the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

We claim:

1. A computer-implemented method for providing a life calendar, the method comprising:
    receiving user data comprising data specific to a user, wherein the user data is automatically received from a source selected from the group consisting of a social networking site, a government account, an educational account, a business account, and an organization database;
    receiving financial data of a user, wherein the financial data is automatically received from a financial institution;
    determining, via a computing device processor, a life event of the user based at least in part on the user data and the financial data;
    associating the user data and financial data with a life calendar so that the life calendar reflects the life event based on the user data and the financial data; and
    presenting the life calendar to the user.

2. The method of claim 1, wherein the life event is determined in part by comparing the user data and financial data for the user to a model created using bank data.

3. The method of claim 1, wherein the life event of the user comprises at least one of a birth, a death, a marriage, a divorce, a retirement, a change in education expenses, a home purchase, travel, a change in charitable giving, a change in employment, change in age, and an indication of a user hobby, each of which are associated directly with the user.

4. The method of claim 1, wherein the financial data is owned by a financial institution where the user holds an account.

5. The method of claim 1, wherein the financial data comprises financial transaction data of the user.

6. The method of claim 5, wherein the financial transaction data comprises at least one of a purchase made by the user, deposit made by the user, withdrawal made by the user, loan issued to the user, mortgage issued to the user, lien associated with the user, suretyship agreement for the user, investment transaction made by the user, transfer made by the user, credit request made by the user, government status change of the user, tax transaction associated with the user, and application for any of the previous transactions.

7. The method of claim 1, wherein the financial data comprises at least one financial plan of the user.

8. The method of claim 7, wherein the at least one financial plan of the user comprises at least one of a user's preferred financial risk level, a user's financial goals, predicted changes in a user's financial situation, or a level of return the user would like from an investment.

9. The method of claim 1, wherein the presenting the life calendar to the user comprises displaying the life calendar on a computer screen.

10. A computer-implemented method for providing a life calendar, the method comprising:
    receiving user data associated with a user, the user data comprising user events and financial data of the user, wherein the user events are automatically received from a source selected from the group consisting of a social networking site, a government account, an educational account, a business account, and an organization database, and wherein the financial data are automatically received from a financial institution;
    determining, via a computing device processor, a life event of the user based at least in part on the user events and the financial data; and
    populating a life calendar with the user data.

11. The method of claim 10, further comprising allowing the user to input preferences indicating what user data to include in the life calendar database.

12. The method of claim 10, wherein the receiving user data comprises receiving historical user data and tracking the user data associated with the user on an ongoing basis.

13. The method of claim 10, further comprising allowing access to the life calendar through a portal selected from at least one of a computer program, a website, an electronic display, or a handheld device.

14. A computer-implemented method for providing a life calendar, the method comprising:
    receiving user data associated with a user, the user data comprising data associated with user-specific events and financial data of the user, wherein the user data is automatically received from a source selected from the group consisting of a social networking site, a government account, an educational account, a business account, and an organization database, wherein the user-specific events comprise events associated with financial events and life events of the user;
    determining, via a computing device processor, a life event of the user based at least in part on the user data and the financial data;
    determining, via a computing device processor, recommendations for the user based on the life event;
    associating the user data and recommendations with the life calendar so that when the life calendar is presented, the user data and recommendations will be displayed to the user in the life calendar; and
    presenting the life calendar to the user.

15. The method of claim 14, further comprising refining the recommendations for the user using bank data of the financial institution.

16. The method of claim 15, wherein the refining recommendations for the user using bank data comprises comparing the user data to models created using bank data.

17. The method of claim 14, further comprising allowing enrollment in a recommended service or purchase of a recommended product associated with the financial institution in response to the user accepting the recommended service or the recommended product.

18. A system for providing a life calendar, the system comprising:
    a processor; and
    a life calendar server application operable on the processor, wherein the life calendar server application comprises at least one module that, when executed on the processor:
    receive user data comprising data specific to a user, wherein the user data is automatically received from a source selected from the group consisting of a social networking site, a government account, an educational account, a business account, and an organization database;
    receive financial data of a user, wherein the financial data is automatically received from a financial institution;
    determine, via a computing device processor, a life event of the user based at least in part on the user data and the financial data;
    associate the user data and financial data with a life calendar so that the life calendar reflects the life event based on the user data and the financial data and
    automatically populates and displays the life event and recommendations in the life calendar accessible to the user.

19. The system of claim 18, wherein the life calendar server application further comprises a recommendation determination module based on user data.

20. The system of claim 18, wherein the life calendar server application comprises a recommendation refining module based on bank data at the financial institution.

21. The system of claim 18, wherein the life calendar server application comprises a recommendation enrollment module in accordance with one or more of the recommendations.

22. The system of claim 18, wherein the life calendar application comprises a presentation module in response to the user requesting to view the life calendar.

23. A non-transitory computer readable medium having computer usable program code embodied therein to provide a life calendar, the computer usable program code, when executed on a computer, causes the computer to:
    receive user data associated with a user, the user data comprising data associated with user-specific events and financial data directly associated with the user, wherein the user-specific events are automatically received from a source selected from the group consisting of a social networking site, a government account, an educational account, a business account, and an organization database, and wherein the financial data are automatically received from a financial institution;
    store the user data into a database;
    determining, via a computing device processor, a life event of the user based at least in part on the user data and the financial data;
    determine recommendations for the user based at least in part on the life event;
    associate the life event and the recommendations with the life calendar so that when the life calendar is presented, the life event and recommendations are displayed to the user in the life calendar; and
    present the life calendar to the user.

24. The non-transitory computer readable medium of claim 23, wherein the computer usable program code further causes the computer determine recommendations for the user based on the user data.

25. The non-transitory computer readable medium of claim 23, wherein the computer usable program code further causes the computer to refine recommendations based on comparison of user data to bank data.

* * * * *